(12) United States Patent
Nishikawa (10) Patent No.: US 10,916,759 B2
(45) Date of Patent: Feb. 9, 2021

(54) POWER STORAGE SYSTEM

(71) Applicant: SANYO Electric Co., Ltd., Daito (JP)

(72) Inventor: Masato Nishikawa, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 34 days.

(21) Appl. No.: 16/475,532

(22) PCT Filed: Dec. 26, 2017

(86) PCT No.: PCT/JP2017/046580
§ 371 (c)(1),
(2) Date: Jul. 2, 2019

(87) PCT Pub. No.: WO2018/131461
PCT Pub. Date: Jul. 19, 2018

(65) Prior Publication Data
US 2020/0227713 A1 Jul. 16, 2020

(30) Foreign Application Priority Data

Jan. 11, 2017 (JP) ................................. 2017-002915

(51) Int. Cl.
*H01M 2/20* (2006.01)
*H01M 2/10* (2006.01)
(Continued)

(52) U.S. Cl.
CPC ............ *H01M 2/206* (2013.01); *H01G 11/10* (2013.01); *H01G 11/22* (2013.01);
(Continued)

(58) Field of Classification Search
CPC ............... H01M 2/206; H01M 2/1077; H01M 10/0525; H01M 2220/20
See application file for complete search history.

(56) References Cited

U.S. PATENT DOCUMENTS

2014/0234687 A1* 8/2014 Fuhr ................... H01M 10/613
429/120
2015/0079454 A1* 3/2015 Maguire ............. H01M 2/1077
429/159

(Continued)

FOREIGN PATENT DOCUMENTS

| JP | 2013-8521 A | 1/2013 |
| JP | 2014-186970 A | 10/2014 |

(Continued)

OTHER PUBLICATIONS

International Search Report dated Feb. 27, 2018, issued in counterpart International Application No. PCT/JP2017/046580 (1 page1).

*Primary Examiner* — Stewart A Fraser
(74) *Attorney, Agent, or Firm* — Westerman, Hattori, Daniels & Adrian, LLP (57) ABSTRACT

A power storage system includes a plurality of power storage modules each including a plurality of cells that is layered perpendicularly to an installation plane and is electrically connected dries. The plurality of power storage modules is mounted on a frame. A plurality of conductive trays is aligned horizontally between the frame and the plurality of power storage modules and horizontally divides the plurality of power storage modules into a plurality of groups.

7 Claims, 6 Drawing Sheets

(51) Int. Cl.
*H01M 10/0525* (2010.01)
*H01G 11/10* (2013.01)
*H01G 11/22* (2013.01)

(52) U.S. Cl.
CPC ..... *H01M 2/1077* (2013.01); *H01M 10/0525* (2013.01); *H01M 2220/20* (2013.01)

(56) References Cited

U.S. PATENT DOCUMENTS

2015/0349314 A1 12/2015 Yasui et al.
2018/0316071 A1* 11/2018 Newman ............. H01M 10/653

FOREIGN PATENT DOCUMENTS

| | | |
|---|---|---|
| JP | 2014-192044 A | 10/2014 |
| JP | 2016-81857 A | 5/2016 |
| WO | 2014/109284 A1 | 7/2014 |

\* cited by examiner

POWER STORAGE SYSTEM

TECHNICAL FIELD

The present invention relates to a power storage system including a plurality of power storage modules.

BACKGROUND ART

Hybrid vehicles (HVs), plug-in hybrid vehicles (PHVs), and electric vehicles (EVs) have been widely spreading in recent years. These vehicles are each equipped with a secondary battery as a key device. Examples of such a secondary battery mounted on a vehicle mainly include a nickel hydride battery and a lithium ion battery. The lithium ion battery having high energy density will spread more quickly in the future.

A traction battery system mounted on a vehicle needs to output high voltage and thus needs to include a plurality of cells connected in series. The traction battery system typically includes a plurality of rectangular batteries aligned horizontally with side surfaces directed downward and accommodated in a case (see PTL 1 and the like).

Traction battery systems have been requested to have reduction in thickness, and some vehicle types demand height less than or equal to 100 mm. Such a design of the horizontally aligned rectangular batteries has height from 120 mm to 150 mm and is difficult to satisfy such a demand.

In view of this, there may be devised a power storage system including a plurality of horizontally aligned power storage modules each including three to seven rectangular batteries layered vertically with rear surfaces directed downward. In such a system configuration, the plurality of power storage modules is fixed to a bottom plate of a metal housing, and a bus bar connects electrodes of cells vertically adjacent to each other whereas another bus bar connects electrodes of the power storage modules horizontally adjacent to each other.

CITATION LIST

Patent Literature

PTL 1: Unexamined Japanese Patent Publication No. 2014-192044

SUMMARY OF THE INVENTION

In a case where the power storage system having the system configuration described above allows entry of liquid, two bus bars respectively connected to two bottom cells in two power storage modules at both horizontal ends may be short-circuited via the liquid and the bottom plate. When the power storage modules at the both ends having high voltage have a liquid junction, heavy current may flow to generate a spark.

The present invention has been achieved in view of such circumstances, and has an object to provide a technique for enhanced safety upon entry of liquid to a power storage system including a plurality of power storage modules aligned horizontally and each configured by a plurality of cells layered perpendicularly to an installation plane.

In order to solve the problem mentioned above, a power storage system according to an aspect of the present invention includes a plurality of power storage modules each including a plurality of cells that is layered perpendicularly to an installation plane and is electrically connected in series. The plurality of power storage modules being aligned horizontally with respect to the installation plane and being electrically connected in series. The power storage system further including: a plurality of connection members electrically connecting the cells adjacent to each other and the power storage modules adjacent to each other; a frame provided with the plurality of power storage modules; and a plurality of conductive trays aligned horizontally between the frame and the plurality of power storage modules and horizontally dividing the plurality of power storage modules into a plurality of groups.

The present invention also includes effective aspects obtained by converting any appropriate combination of the constituent elements described above and expression of the present invention among a method, an apparatus, a system, and the like.

The present invention achieves enhanced safety upon entry of liquid to a power storage system including a plurality of power storage modules aligned horizontally and each configured by a plurality of cells layered perpendicularly to an installation plane.

DESCRIPTION OF EMBODIMENTS

Comparative Example

Figure 1:
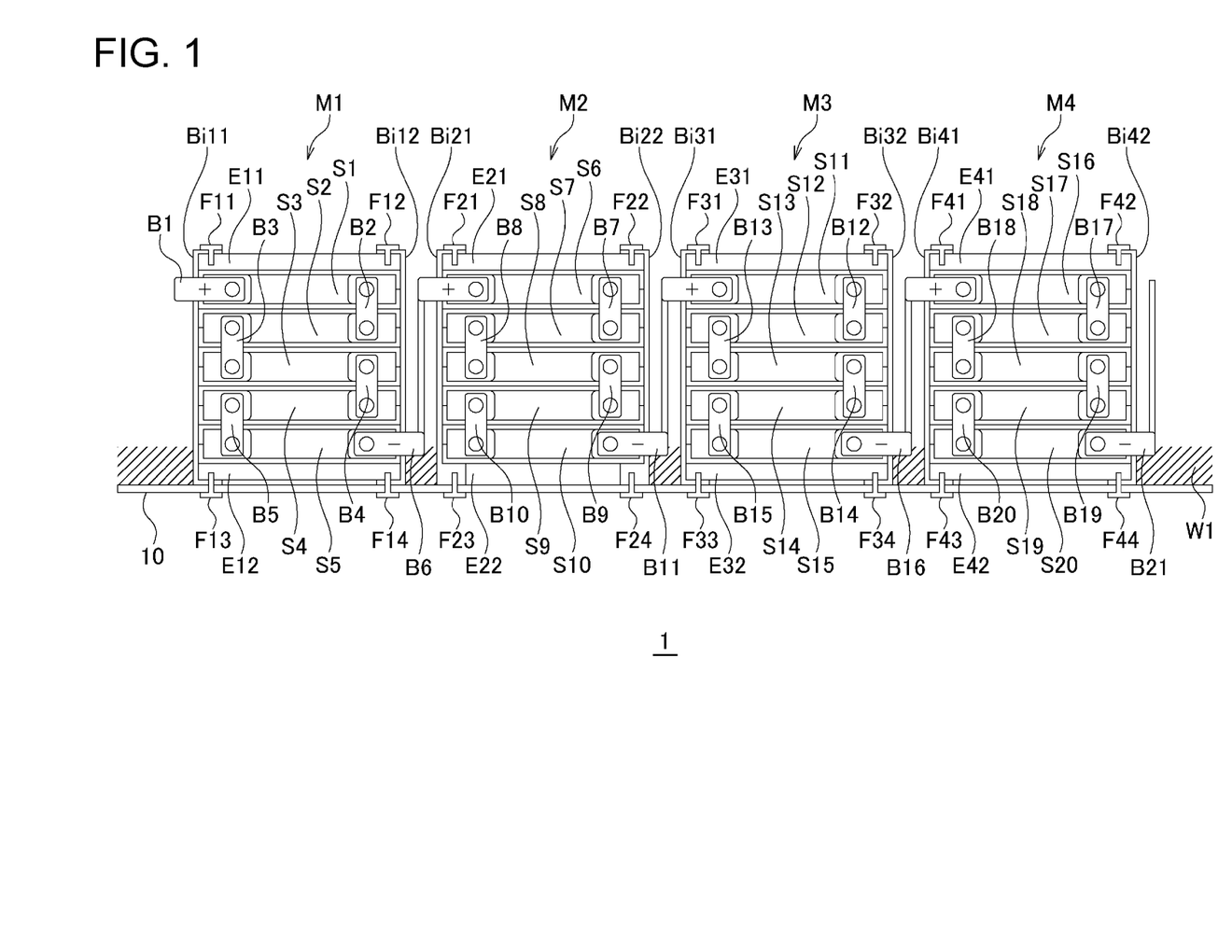
FIG. 1 is a schematic view depicting a configuration of a power storage system according to a comparative example.

FIG. 1 is a schematic view depicting a configuration of power storage system 1 according to a comparative example. Power storage system 1 is adopted as a power source apparatus mounted on an HV, a PHV, or an EV and configured to supply a traction motor with electric power. The traction motor may have high output power to enable self travel (for an EV, strong hybrid), or may have low output power to assist engine travel (mild hybrid).

Power storage system 1 includes a plurality of power storage modules M1 to M4 connected in series. Power storage system 1 depicted in FIG. 1 includes four power storage modules M1 to M4. Power storage modules M1 to M4 include a plurality of cells S1 to S5, S6 to S10, S11 to S15, S16 to S20, respectively, connected in series. Power storage modules M1 to M4 depicted in FIG. 1 each include five cells connected in series. Power storage system 1 is accordingly configured to receive and output voltage obtained by multiplying unit cell voltage by 20.

Each of the cells may be configured by a lithium ion battery cell, a nickel hydride battery cell, a lead battery cell, an electric double layer capacitor cell, a lithium ion capacitor cell, or the like. Hereinafter, the present description assumes that the cells are each configured by a rectangular lithium ion battery cell (nominal voltage from 3.6 V to 3.7 V).

First power storage module M1 is specifically configured as described below. Five rectangular cells S1 to S5 are layered perpendicularly to an installation plane such that surfaces having the largest areas serve as contact surfaces. The cells are layered such that surfaces provided with projecting electrodes (hereinafter, referred to as electrode surfaces) are aligned and positive electrode terminals and negative electrode terminals are positioned alternately. Five layered cells S1 to S5 are sandwiched between two end plates E11, E12 disposed at vertical ends. Five layered cells S1 to S5 and two end plates E11, E12 are sandwiched between two bind plates Bi11, Bi12 disposed at horizontal ends except the electrode surfaces and surfaces opposite to the electrode surfaces.

Two bind plates Bi11, Bi12 each have both ends bent inward to cover two end plates E11, E12. Bent portions of two bind plates Bi11, Bi12 are provided with a plurality of slots reaching insides of two end plates E11, E12. The plurality of slots receives a plurality of T-shaped fixtures F11 to F14 to fix five layered cells S1 to S5, two end plates E11, E12, and two bind plates Bi11, Bi12. At the installation plane, metal frame 10 is inserted between the bent portions of two bind plates Bi11, Bi12 and T-shaped fixtures F13, F14, and has slots positioned correspondingly to T-shaped fixtures F13, F14. T-shaped fixtures F13, F14 are fitted into the plurality of slots from outside metal frame 10 at the installation plane. The T-shaped fixtures may be replaced with screws.

Second power storage module M2 to fourth power storage module M4 are configured similarly to first power storage module M1. Four power storage modules M1 to M4 are aligned on metal frame 10 to have predetermined horizontal intervals with respect to the installation plane, with the electrode surfaces being aligned. Metal frame 10 may configure a bottom plane of the metal housing having a box shape, may configure a bottom plane of the metal housing having a vessel shape, or may be provided as an independent installation plate. Metal frame 10 is made of not resin but metal for secured strength of entire power storage system 1.

First bus bar B1 has a first end connected to the positive electrode terminal of first cell S1 in first power storage module M1 and a second end functioning as a positive electrode terminal of entire power storage system 1. The negative electrode terminal of first cell S1 and the positive electrode terminal of second cell S2 are connected via second bus bar B2, the negative electrode terminal of second cell S2 and the positive electrode terminal of third cell S3 are connected via third bus bar B3, . . . , and the negative electrode terminal of fourth cell S4 and the positive electrode terminal of fifth cell S5 are connected via fifth bus bar B5.

The negative electrode terminal of fifth cell S5 in first power storage module M1 and the positive electrode terminal of sixth cell S6 in second power storage module M2 are connected via sixth bus bar B6 having a crank shape. The negative electrode terminal of sixth cell S6 and the positive electrode terminal of seventh cell S7 are connected via seventh bus bar B7, . . . , and the negative electrode terminal of tenth cell S10 in second power storage module M2 and the positive electrode terminal of eleventh cell S11 in third power storage module M3 are connected via eleventh bus bar B11 having a crank shape. The negative electrode terminal of eleventh cell S11 and the positive electrode terminal of twelfth cell S12 are connected via twelfth bus bar B12, . . . , and the negative electrode terminal of fifteenth cell S15 in third power storage module M3 and the positive electrode terminal of sixteenth cell S16 in fourth power storage module M4 are connected via sixteenth bus bar B16 having a crank shape. Twenty-first bus bar B21 has a first end connected to the negative electrode terminal of twentieth cell S20 in fourth power storage module M4 and a second end functioning as a negative electrode terminal of entire power storage system 1.

Assume that power storage system 1 having the system configuration described above allows entry of liquid. Power storage system 1 allows entry of liquid in a case where a vehicle equipped with power storage system 1 falls into the sea, a lake, or a marsh, or rushes into a large puddle and fails to leave, where a liquid cooling coolant system is damaged, or the like.

FIG. 1 depicts a state where liquid W1 such as salt water enters power storage system 1 and sixth bus bar B6, eleventh bus bar B11, sixteenth bus bar B16, and twenty-first bus bar B21 are partially immersed. This state generates a short circuit path via liquid W1 and metal frame 10, between any two of sixth bus bar B6, eleventh bus bar B11, sixteenth bus bar B16, and twenty-first bus bar B21. The short circuit path has a flow of short circuit current I defined by equation (1).

$$I = E \times (S \div (1 \times \rho)) \ldots \quad \text{Equation (1)}$$

E: short circuit voltage, S: contact area, I: distance, ρ: electric resistivity

When short circuit current I flows between sixth bus bar B6 and twenty-first bus bar B21 in FIG. 1, short circuit voltage E corresponds to both-end voltage of fifteen cells S6 to S20 and short circuit current I increases. Increased short circuit current I may generate a spark leading to ignition if there is any combustible nearby. Described hereinafter is power storage system 1 incorporating a mechanism for prevention of such ignition caused by entry of liquid.

First Exemplary Embodiment

Figure 2:
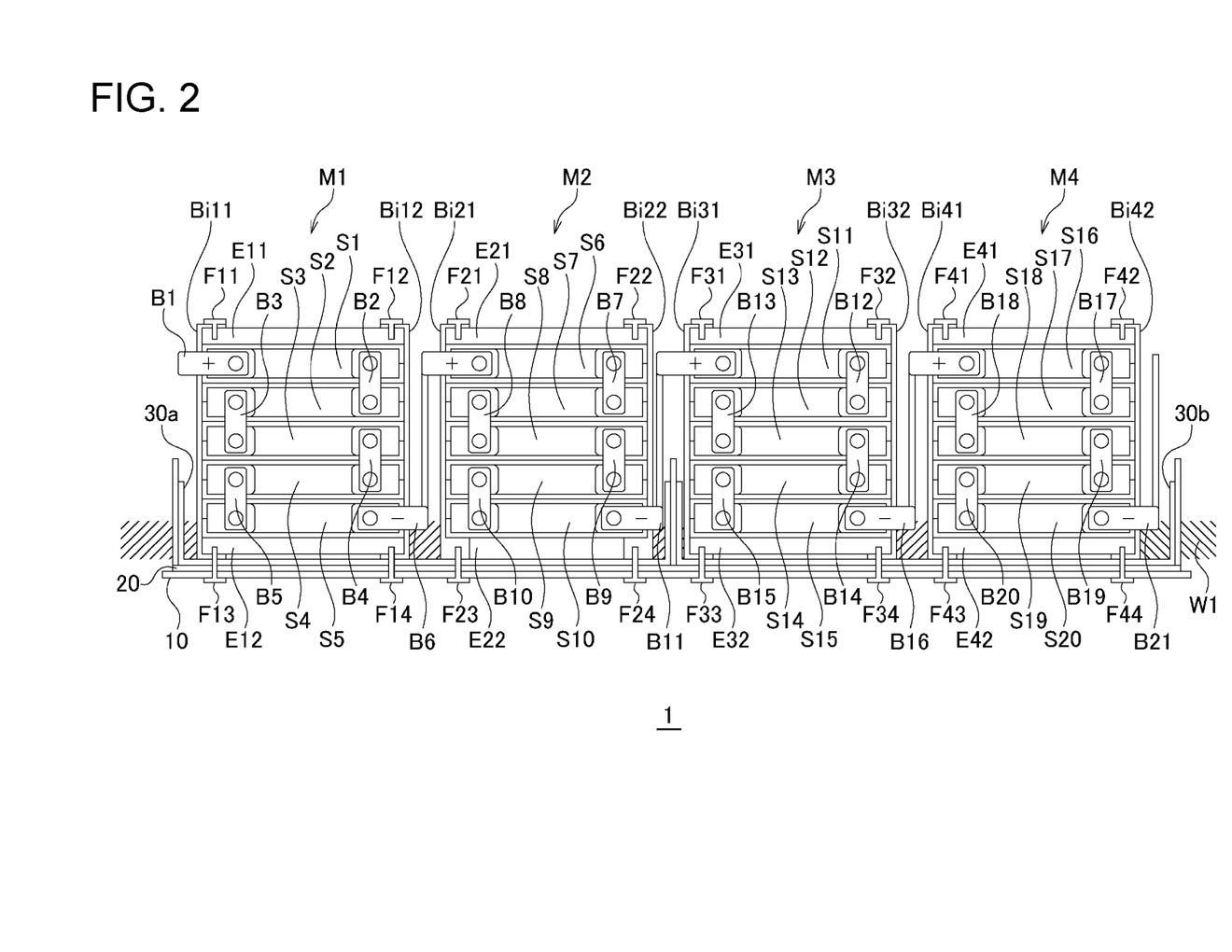
FIG. 2 is a schematic view depicting a configuration of a power storage system according to a first exemplary embodiment of the present invention.

FIG. 2 is a schematic view depicting a configuration of power storage system 1 according to a first exemplary embodiment of the present invention. Described below is difference between power storage system 1 according to the comparative example depicted in FIG. 1 and power storage system 1 according to the first exemplary embodiment depicted in FIG. 2. Power storage system 1 according to the first exemplary embodiment further includes resin plate 20 and a plurality of metal trays 30 (first metal tray 30a and second metal tray 30b in FIG. 2).

The plurality of metal trays 30 has conductivity, horizontally divides the plurality of power storage modules M1 to M4 into a plurality of groups, and is aligned on metal frame 10 with insulating resin plate 20 interposed between metal trays 30 and metal frame 10. FIG. 2 depicts first metal tray 30a accommodating first power storage module M1 and second power storage module M2, and second metal tray 30b accommodating third power storage module M3 and fourth power storage module M4. Resin plate 20 is inserted also between a side surface of first metal tray 30a and a side surface of second metal tray 30b for insulation between first metal tray 30a and second metal tray 30b.

T-shaped fixtures F13, 14, 23, 24, 33, 34, 43, 44 at the installation plane penetrate metal frame 10, resin plate 20, metal trays 30a, 30b, and the bent portions of bind plates Bi11 to Bi42 and are fixedly fitted into the slots reaching insides of end plates E12, 22, 32, 34.

FIG. 2 depicts a state where liquid W1 enters first metal tray 30a and sixth bus bar B6 and eleventh bus bar B11 are partially immersed, and liquid W1 enters second metal tray 30b and sixteenth bus bar B16 and twenty-first bus bar B21 are partially immersed. This state generates a short circuit path between sixth bus bar B6 and eleventh bus bar B11 via liquid W1 and first metal tray 30a. Short circuit current I flowing through this short circuit path corresponds to current flowing at both-end voltage of five cells S6 to S10, and is much smaller than short circuit current I flowing at the above-mentioned both-end voltage of fifteen cells S6 to S20.

There is similarly generated a short circuit path between sixteenth bus bar B16 and twenty-first bus bar B21 via liquid W1 and second metal tray 30b. Short circuit current I flowing through this short circuit path also corresponds to current flowing at both-end voltage of five cells S16 to S20.

The system configuration depicted in FIG. 2 is preferably designed to have electric resistivity p of metal trays 30 being less than electric resistivity p of metal frame 10. For example, metal trays 30 are made of copper, a copper alloy, aluminum, or an aluminum alloy, and metal frame 10 is made of iron or a ferroalloy. Current I is more likely to flow through a substance having smaller electric resistivity p. Even when resin plate 20 is removed, material selection described above allows metal trays 30 to have a flow of larger current I than current flowing through metal frame 10, to decrease short circuit current I flowing between sixth bus bar B6 and twenty-first bus bar B21. Metal frame 10 having a surface plated, provided with an insulation film, or provided with insulation coating will further decrease or eliminate short circuit current I flowing between sixth bus bar B6 and twenty-first bus bar B21.

Figure 3A:
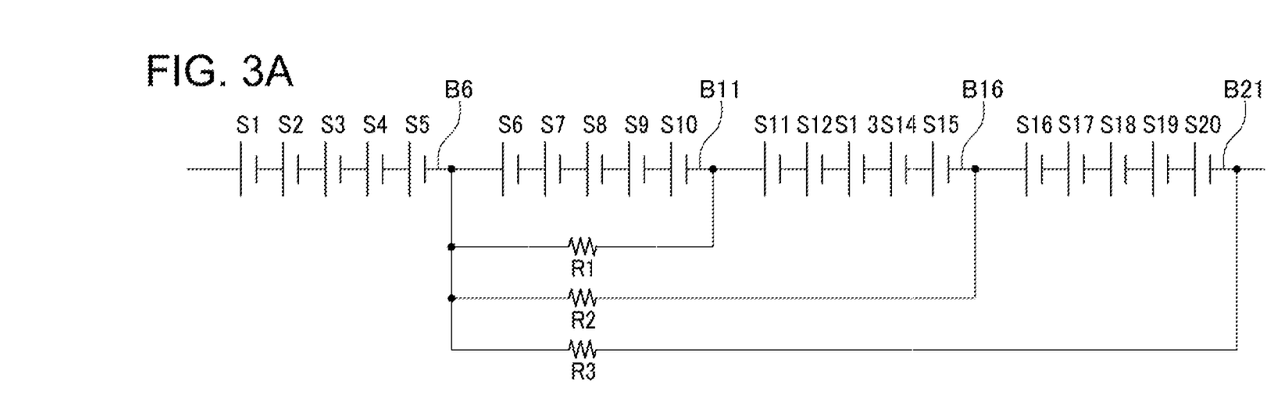
FIG. 3A and FIG. 3B are views of equivalent circuits of the power storage system depicted in FIG. 1 and FIG. 2, respectively, upon entry of liquid.

FIG. 3A and FIG. 3B are views of equivalent circuits of power storage systems 1 depicted in FIG. 1 and FIG. 2, respectively, upon entry of liquid. FIG. 3A is a view of the equivalent circuit including sixth bus bar B6 as a reference, of power storage system 1 depicted in FIG. 1, upon entry of liquid. First resistance R1 is combined resistance of solution resistance between sixth bus bar B6 and metal frame 10, resistance of metal frame 10, and solution resistance between metal frame 10 and eleventh bus bar B11. Second resistance R2 is combined resistance of solution resistance between sixth bus bar B6 and metal frame 10, resistance of metal frame 10, and solution resistance between metal frame 10 and sixteenth bus bar B16. Third resistance R3 is combined resistance of solution resistance between sixth bus bar B6 and metal frame 10, resistance of metal frame 10, and solution resistance between metal frame 10 and twenty-first bus bar B21. Voltage E applied to third resistance R3 is three times larger than voltage E applied to first resistance R1, so that largest current I flows between sixth bus bar B6 and twenty-first bus bar B21. Resistance increases as distance 1 increases, so that first resistance R1, second resistance R2, and third resistance R3 have a relation first resistance R1<second resistance R2<third resistance R3.

Figure 3B:
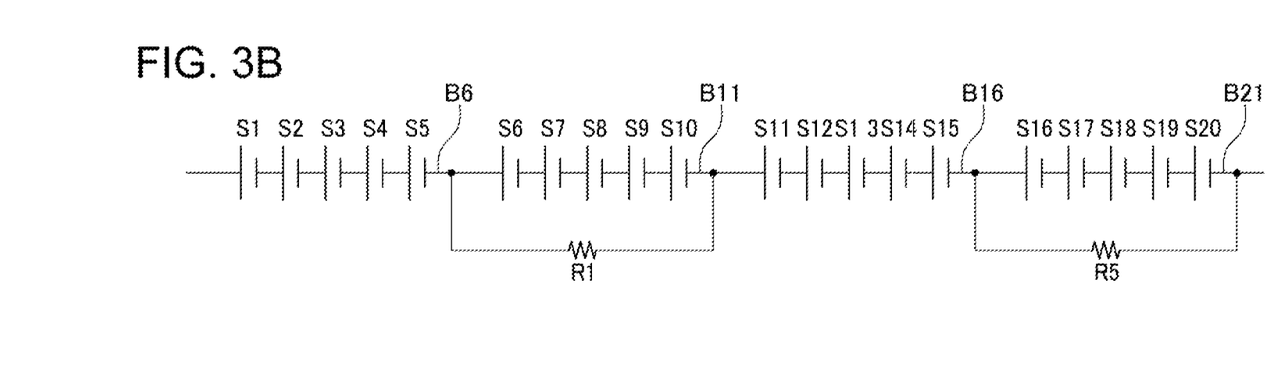

FIG. 3B is a view of the equivalent circuit of power storage system 1 depicted in FIG. 2, upon entry of liquid. Fifth resistance R5 is combined resistance of solution resistance between sixteenth bus bar B16 and metal frame 10, resistance of metal frame 10, and solution resistance between metal frame 10 and twenty-first bus bar B21. Sixth bus bar B6, sixteenth bus bar B16, and twenty-first bus bar B21 are insulated from one another so as not to allow current I to flow, whereas current I flows between sixth bus bar B6 and eleventh bus bar B11 as well as between sixteenth bus bar B16 and twenty-first bus bar B21.

As described above, the first exemplary embodiment provides the power storage system including the four power storage modules horizontally aligned and each including the five rectangular cells layered vertically. The power storage system thus has reduced height from 60 mm to 70 mm, so as to be installed in a space having small height in a vehicle. The first exemplary embodiment accordingly achieves provision of the power storage system with high installation flexibility.

The plurality of power storage modules connected in series is electrically divided into the plurality of groups by the plurality of metal trays to enhance safety upon entry of liquid. Specifically, voltage at a short-circuited portion upon a liquid junction can be suppressed to voltage for a fewer number of cells (five cells in exemplary FIG. 2). This prevents excessive discharge current upon a liquid junction.

FIG. 2 exemplifies the case where two power storage modules are disposed on a single metal tray, which may alternatively be provided with three or more power storage modules. In a case where short circuit voltage for ten cells is allowable, a single metal tray may be provided with three power storage modules. The number of power storage modules disposed on a single metal tray may be increased by decreasing the number of cells layered in each of the power storage modules.

Still alternatively, a single metal tray may be provided for each power storage module. Only one cell is to be short-circuited upon entry of liquid in this case. In first power storage module M1, entry of liquid generates a short circuit between fifth bus bar B5 and sixth bus bar B6 (between the positive electrode terminal and the negative electrode terminal of fifth cell S5) via liquid W1. Such a short circuit at low voltage decreases discharge current to achieve increase in time of energy release from power storage system 1.

Power storage system 1 having entry of liquid achieves safety through releasing energy stored in power storage system 1 as quickly as possible. If power storage system 1 storing energy is immersed in liquid for a long period of time, power storage system 1 starts corroding with a higher risk of an unexpected short circuit path having an excessive current flow. The first exemplary embodiment achieves discharge at relatively large current within a range not reaching overcurrent upon entry of liquid, for enhanced safety.

Second Exemplary Embodiment

Figure 4:
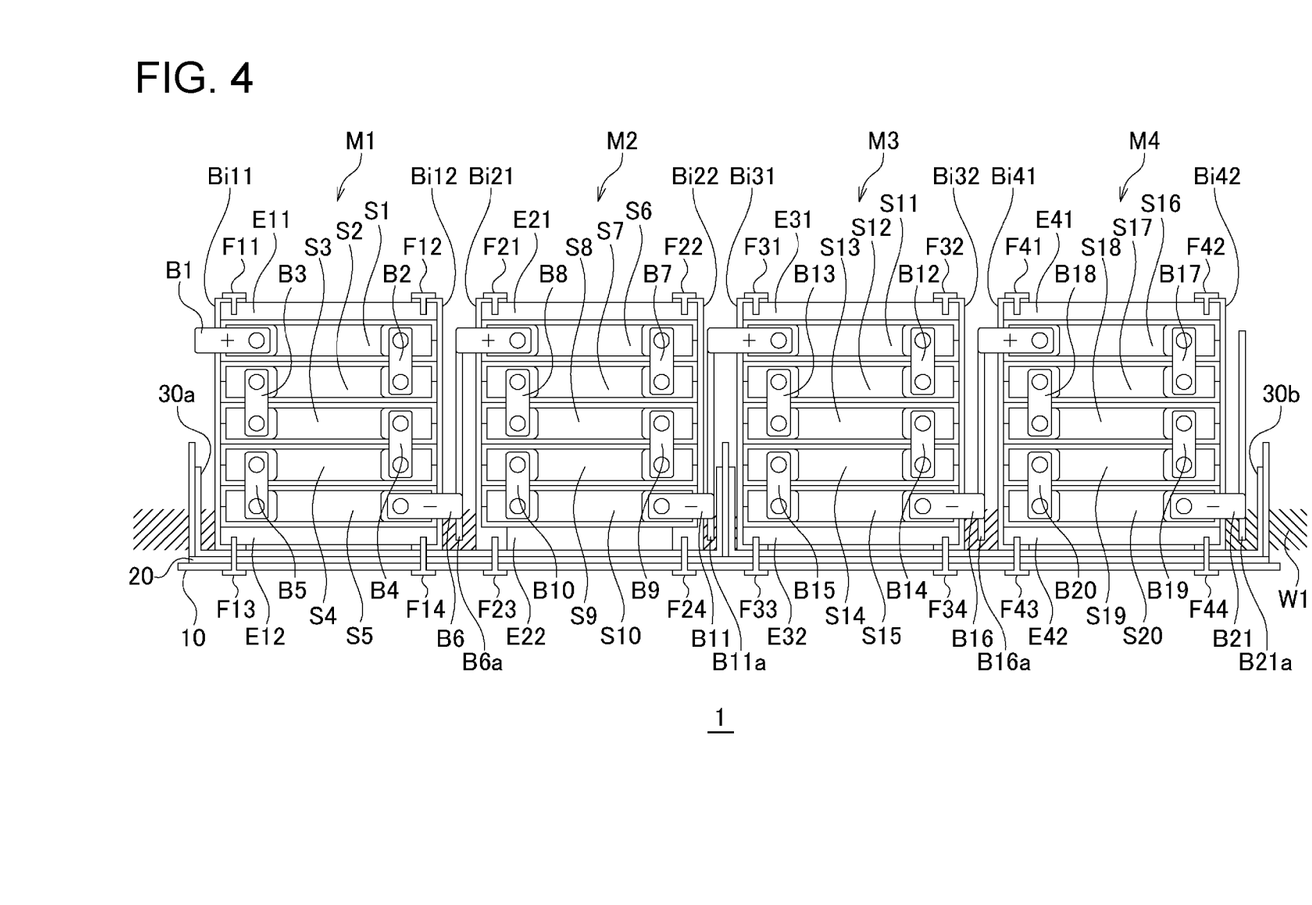
FIG. 4 is a schematic view depicting a configuration of a power storage system according to a second exemplary embodiment of the present invention.

FIG. 4 is a schematic view depicting a configuration of power storage system 1 according to a second exemplary embodiment of the present invention. Power storage system 1 according to the second exemplary embodiment is obtained by adding, to power storage system 1 depicted in FIG. 2, projections B6a, B11a, B16a, B21a that are respectively provided at bus bars B6, B11, B16, B21 each having the crank shape and extend toward first metal tray 30a and second metal tray 30b.

As indicated in equation (1), short circuit current I is increased by decreasing distance 1 of a short circuit path. The second exemplary embodiment decreases the distance between sixth bus bar B6 and eleventh bus bar B11 and the distance between sixteenth bus bar B16 and twenty-first bus bar B21 to achieve larger discharge current upon entry of liquid in comparison to the configuration according to the first exemplary embodiment. Power storage system 1 can further start discharging at earlier timing upon entry of liquid.

The projections may alternatively be provided at only one of sixth bus bar B6 and eleventh bus bar B11 and at only one of sixteenth bus bar B16 and twenty-first bus bar B21. This achieves less increase of discharge current in comparison to the configuration depicted in FIG. 4, but the discharge current is larger in comparison to the configuration according to the first exemplary embodiment.

Third Exemplary Embodiment

Figure 5:
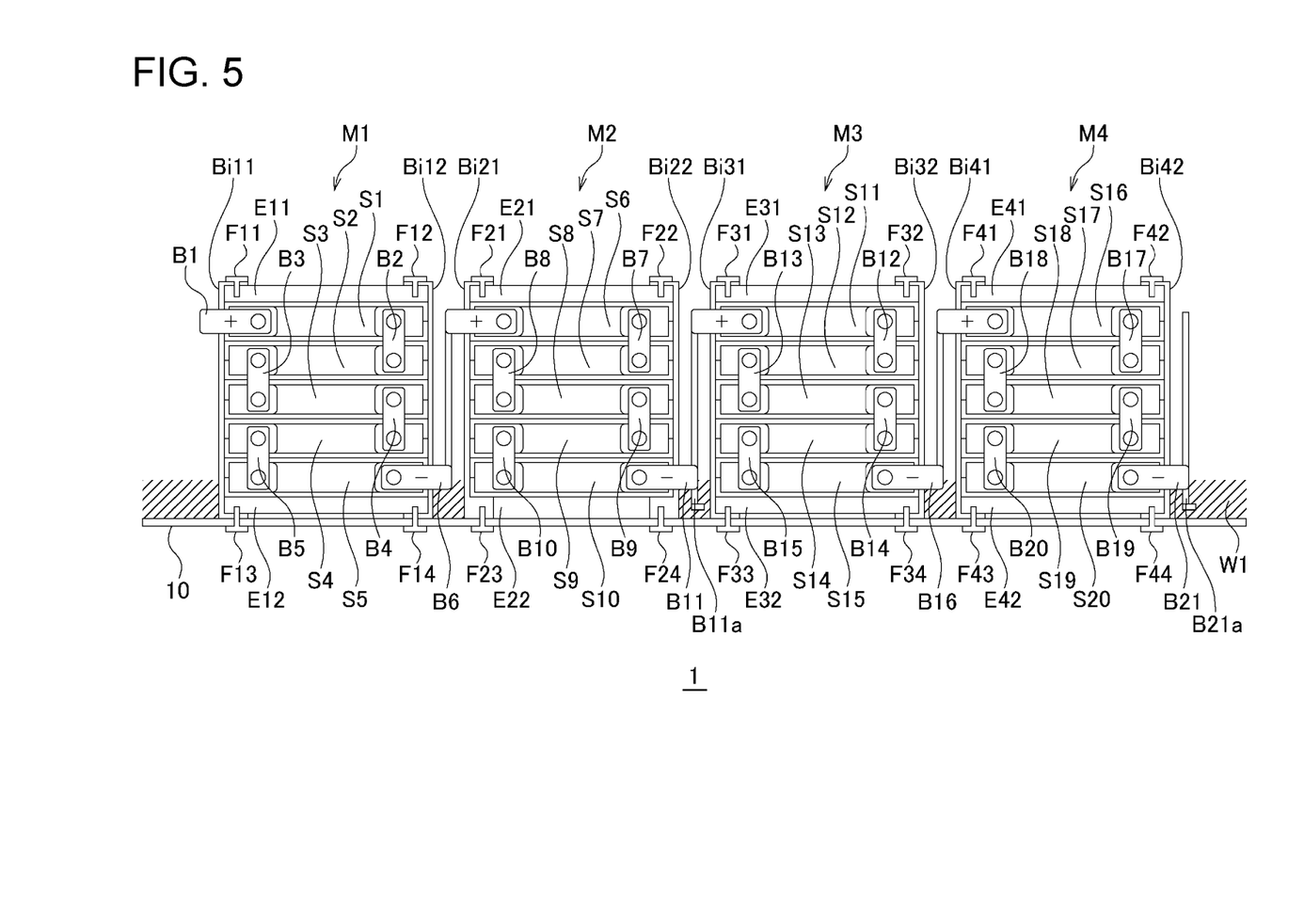
FIG. 5 is a schematic view depicting a configuration of a power storage system according to a third exemplary embodiment of the present invention.

FIG. 5 is a schematic view depicting a configuration of power storage system 1 according to a third exemplary embodiment of the present invention. Power storage system 1 according to the third exemplary embodiment is obtained by adding, to power storage system 1 depicted in FIG. 1, projections B11a, B16b provided at eleventh bus bar B11 and sixteenth bus bar B16, respectively.

The configuration depicted in FIG. 5 includes neither metal trays 30 nor resin plate 20, so that sixth bus bar B6 may be conductive with any of eleventh bus bar B11, sixteenth bus bar B16, and twenty-first bus bar B21 upon entry of liquid as depicted in FIG. 3A. Sixth bus bar B6 is most likely to form a short circuit path with eleventh bus bar B11 closest to sixth bus bar B6. Sixteenth bus bar B16 according to the third exemplary embodiment has projection B6a to further decrease the distance between sixth bus bar B6 and eleventh bus bar B11 and be more likely to form a short circuit path at eleventh bus bar B11. This reduces a risk of a sudden flow of heavy current between sixth bus bar B6 and twenty-first bus bar B21. Sixteenth bus bar B16 and twenty-first bus bar B21 have a relation similar to the relation between sixth bus bar B6 and sixteenth bus bar B16.

As depicted in FIG. 5, projection B11a of eleventh bus bar B11 has a distal end bent to parallelly face metal frame 10. This leads to increase in contact area S between eleventh bus bar B11 and metal frame 10 via liquid W1. As indicated in equation (1), short circuit current I increases as contact area S increases. Projection B21a of twenty-first bus bar B21 has a distal end bent in a similar manner. This is more likely to cause current to flow from sixth bus bar B6 to eleventh bus bar B11. Distal ends of projections B6a, B11a, B16a, B21a depicted in FIG. 4 may be bent in a similar manner. FIG. 5 depicts eleventh bus bar B11 and twenty-first bus bar B21 each provided with a projection. Sixth bus bar B6 and sixteenth bus bar B16 may also be each provided with a projection.

Fourth Exemplary Embodiment

Figures 6A, 6B:
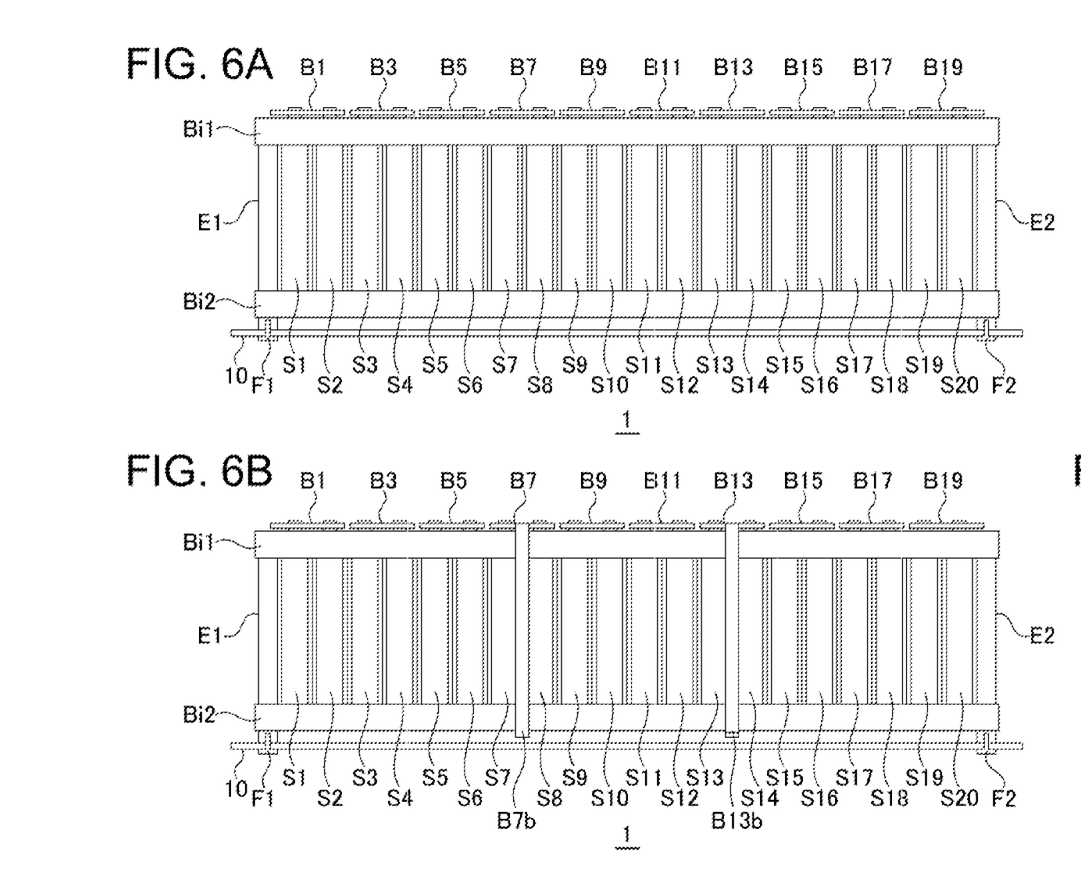
FIG. 6A to FIG. 6C are schematic views each explanatorily depicting a configuration of a power storage system according to a fourth exemplary embodiment of the present invention.
Figure 6C:
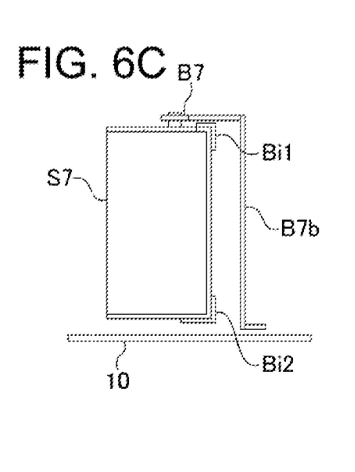

FIG. 6A to FIG. 6C are explanatory schematic views depicting a configuration of power storage system 1 according to a fourth exemplary embodiment of the present invention. FIG. 6A is a schematic view depicting a configuration of power storage system 1 according to a comparative example of the fourth exemplary embodiment of the present invention. Power storage system 1 includes the plurality of cells S1 to S20 connected in series.

Twenty rectangular cells S1 to S20 are layered horizontally with respect to the installation plane such that the surfaces having the largest areas serve as contact surfaces. The cells are layered such that the electrode surfaces are aligned on a plane opposite to the installation plane and the positive electrode terminals and the negative electrode terminals are positioned alternately. Twenty layered cells S1 to S20 are sandwiched between two end plates E1, E2 disposed at horizontal ends. Twenty layered cells S1 to S20 and two end plates E1, E2 each have four longitudinal sides provided with L-shaped bind bars Bi1, Bi2 fixed to the sides (opposite surfaces not depicted).

Two end plates E1, E2 have distal ends extending toward metal frame 10 and distal end portions provided with a plurality of slots. Metal frame 10 has a plurality of slots positioned correspondingly. A plurality of T-shaped fixtures F1, F2 (opposite surfaces not depicted) is fitted into the plurality of slots from outside metal frame 10. The T-shaped fixtures may be replaced with screws.

The negative electrode terminal of first cell S1 and the positive electrode terminal of second cell S2 are connected via first bus bar B1, the negative electrode terminal of second cell S2 and the positive electrode terminal of third cell S3 are connected via second bus bar (not depicted), the negative electrode terminal of third cell S3 and the positive electrode terminal of fourth cell S4 are connected via third bus bar B3, . . . , and the negative electrode terminal of nineteenth cell S19 and the positive electrode terminal of twentieth cell S20 are connected via nineteenth bus bar B19.

When power storage system 1 depicted in FIG. 6A allows entry of liquid, discharge for release of energy stored in power storage system 1 will not start until a liquid level rises to reach the electrode surfaces. FIG. 6B is a schematic view depicting a configuration of power storage system 1 according to the fourth exemplary embodiment. In power storage system 1 according to the fourth exemplary embodiment, at least two of bus bars B1 to B19 are provided with wings B7b, B13b. FIG. 6A exemplifies seventh bus bar B7 and thirteenth bus bar B13 to be provided with wings B7b, B13b, respectively.

Wing B7b extends from a longitudinal side surface of a conductive plate member connecting the negative electrode terminal of seventh cell S7 and the positive electrode terminal of eighth cell S8 to outside power storage system 1 to spatially cross bind bar Bi1 and is then bent perpendicularly toward the installation plane. Wing B13b is configured similarly.

FIG. 6C is a schematic view depicting a horizontally seen section of seventh cell S7. Wing B7b has a distal end bent to parallelly face metal frame 10. This increases contact area S between seventh bus bar B7 and metal frame 10 via liquid W1, and such increase in contact area S leads to increase in short circuit current I. This is more likely to cause current to flow from seventh bus bar B7 to thirteenth bus bar B13.

Shorter distance 1 from distal ends of wings B7b, B13b to metal frame 10 leads to an earlier and larger flow of short circuit current I between seventh bus bar B7 and thirteenth bus bar B13 upon entry of liquid to power storage system 1. Short circuit current I flowing, between seventh bus bar B7 and thirteenth bus bar B13 upon entry of liquid corresponds to current flowing at both-end voltage of six cells S8 to S13. Short circuit voltage E can be adjusted by displacing the bus bar having a wing. FIG. 6B exemplifies provision of two bus bars each having a wing. Discharge current may be further increased by provision of four bus bars each having a wing.

As described above, the fourth exemplary embodiment achieves enhanced safety upon entry of liquid to the power storage system including the plurality of cells layered horizontally with respect to the installation plane.

The present invention has been described with reference to the exemplary embodiments. Those skilled in the art will comprehend that the exemplary embodiments are merely exemplified, the constituent elements and the processing processes have various modification examples in terms of combination, and such modification examples are included in the scope of the present invention.

Two power storage modules adjacent to each other are connected via the bus bar having the crank shape as depicted in FIG. 2, FIG. 4, and FIG. 5. One of the two power storage modules may be vertically inverted to be connected via a bus bar having a plate shape. The bus bars each connecting two power storage modules are alternately positioned below and above. This configuration causes at least three power storage modules to be disposed on single metal tray 30.

The exemplary embodiments may be specified by the following items.

[Item 1]

Power storage system (1) including a plurality of power storage modules (M1) each including a plurality of cells (S1 to S5) that is layered perpendicularly to an installation plane and is electrically connected in series, the plurality of power storage modules (M1 to M4) being aligned horizontally with respect to the installation plane and being electrically connected in series, power storage system (1) further including:

a plurality of connection members (B1 to B21) electrically connecting cells (S1 to S20) adjacent to each other and power storage modules (M1 to M4) adjacent to each other;

frame (10) provided with the plurality of power storage modules (M1 to M4); and a plurality of conductive trays (30a, 30b) aligned horizontally between frame (10) and the plurality of power storage modules (M1 to M4) and horizontally dividing the plurality of power storage modules (M1 to M4) into a plurality of groups.

This configuration prevents a short circuit at high voltage between the plurality of cells (S6 to S20) via liquid and frame (10) upon entry of the liquid to power storage system (1).

[Item 2]

Power storage system (1) according to item 1, in which frame (10) is metal frame (10), power storage system (1) further includes insulating member (20) inserted between metal frame (10) and the plurality of conductive trays (30a, 30b).

This configuration prevents a short circuit beyond such division by conductive trays (30a, 30b).

[Item 3]

Power storage system (1) according to item 1 or 2, in which at least two (M1, M2) of the power storage modules are mounted on each (30a) of the conductive trays.

This configuration limits a range of a short circuit to the plurality of power storage modules (M1, M2) accommodated in conductive tray (30a).

[Item 4]

Power storage system (1) according to any one of items 1 to 3, in which at least one (B6, B11, B16, B21) of the plurality of connection members (B1 to B21) has projection (B6a, B11a, B16a, B21a) extending toward conductive trays (30a, 30b).

This configuration achieves increase in discharge current flowing due to a short circuit upon entry of liquid within a range not reaching overcurrent.

[Item 5]

Power storage system (1) according to item 1 or 2, in which each (B6) of the connection members connecting two (M1, M2) of the power storage modules adjacent to each other connects a negative electrode terminal or a positive electrode terminal of cell (S5) closest to the installation plane in first one (M1) of the power storage modules and a positive electrode terminal or a negative electrode terminal of cell (S6) most distant from the installation plane in second one (M2) of the power storage modules adjacent to first power storage module (M1), and two (M1, M2) of the power storage modules are mounted on each (30a) of the conductive trays.

This configuration enables discharge at both-end voltage of single power storage module (M2) upon entry of liquid.

[Item 6]

Power storage system (1) according to item 5, in which each (B6) of the connection members connecting two (M1, M2) of the power storage modules adjacent to each other has projection (B6a) extending toward the conductive trays (30a).

This configuration achieves increase in discharge current flowing due to a short circuit upon entry of liquid within a range not reaching overcurrent.

[Item 7]

Power storage system (1) according to any one of items 1 to 6, in which conductive trays (30a, 30b) are members smaller in electric resistance than frame (10).

This configuration allows short circuit current upon entry of liquid to preferentially flow to conductive trays (30a, 30b).

REFERENCE MARKS IN THE DRAWINGS

1: power storage system
S1 to S20: first cell to twentieth cell
B1 to B21: first bus bar to twenty-first bus bar
M1 to M4: first power storage module to fourth power storage module
E11, E12, E21, E22, E31, E32, E41, E42, E1, E2: end plate
Bi11, Bi12, Bi21, Bi22, Bi31, Bi32, Bi41, Bi42: bind plate
Bi1, Bi2: bind bar
F11, F12, F13, F14, F21, F22, F23, F24, F31, F32, F33, F34, F41, F42, F43, F44, F1, F2: fixture
10: metal frame
20: resin plate
30a: first metal tray
30b: second metal tray
W1: liquid
R1 to R5: first resistance to fifth resistance
B6a, B11a, B16a, B21a: projection
B7b, B13b: wing

The invention claimed is:

1. A power storage system comprising a plurality of power storage modules each including a plurality of cells that is layered perpendicularly to an installation plane and is electrically connected in series, the plurality of power storage modules being aligned horizontally with respect to the installation plane and being electrically connected in series, the power storage system further comprising:

a plurality of connection members electrically connecting the cells adjacent to each other and the power storage modules adjacent to each other;

a frame provided with the plurality of power storage modules; and a plurality of conductive trays aligned horizontally between the frame and the plurality of power storage modules and horizontally dividing the plurality of power storage modules into a plurality of groups.

2. The power storage system according to claim 1, wherein the frame is a metal frame, the power storage system further comprises an insulating member inserted, between the metal frame and the plurality of conductive trays.

3. The power storage system according to claim 1, wherein at least two of the power storage modules are mounted on each of the conductive trays.

4. The power storage system according to claim 1, wherein at least one of the plurality of connection members has a projection extending toward the conductive trays.

5. The power storage system according to claim 1, wherein
each of the connection members connecting two of the power storage modules adjacent to each other connects a negative electrode terminal or a positive electrode terminal of one of the cells closest to the installation plane in a first one of the power storage modules and a positive electrode terminal or a negative electrode terminal of one of the cells most distant from the installation plane in a second one of the power storage modules adjacent to the first power storage module, and
two of the power storage modules are mounted on each of the conductive trays.

6. The power storage system according to claim 5, wherein each of the connection members connecting two of the power storage modules adjacent to each other has a projection extending toward the conductive trays.

7. The power storage system according to claim 1, wherein the conductive trays are members smaller in electric resistance than the frame.

\* \* \* \* \*